Sept. 21, 1954 A. S. KROTZ 2,689,755
RESILIENT BUSHING AND METHOD OF MAKING THE SAME
Filed Feb. 27, 1952
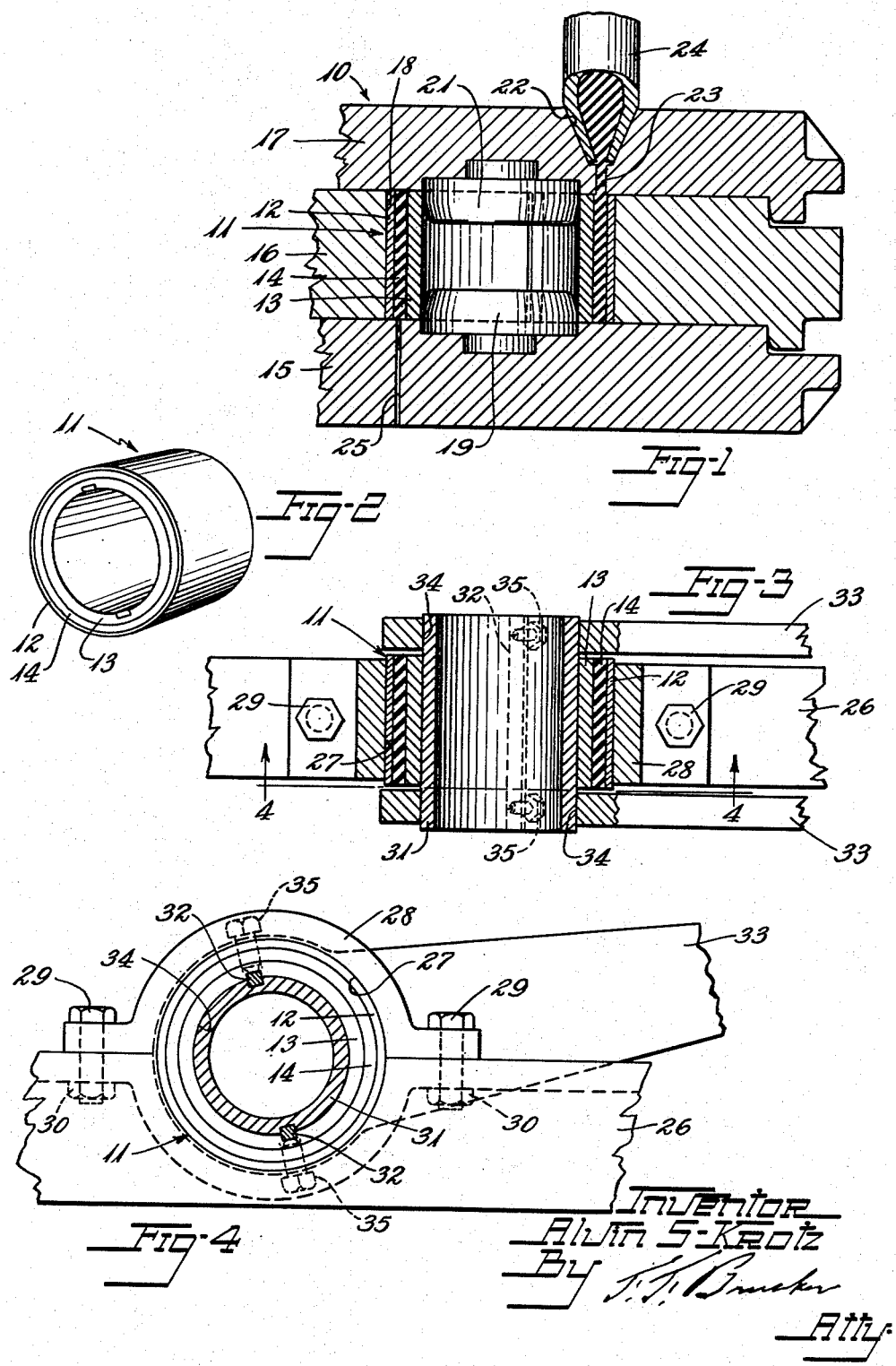
Inventor
Alvin S. Krotz Patented Sept. 21, 1954

2,689,755

UNITED STATES PATENT OFFICE 2,689,755

RESILIENT BUSHING AND METHOD OF MAKING THE SAME

Alvin S. Krotz, Akron, Ohio, assignor to The B. F. Goodrich Company, New York, N. Y., a corporation of New York Application February 27, 1952, Serial No. 273,574

7 Claims. (Cl. 287—85)

This invention relates to resilient flexible connections and to resilient bushings in which the resilient element comprises a body of vulcanized rubber mounted between relatively rotatable sleeves. Bushings of this type are especially useful as torsion springs in which cushioning is provided by stressing the intervening body of resilient rubber material in torsional shear upon relative rotation of the sleeves.

The intervening body of resilient rubber material of a torsion spring bushing is necessarily adhered to the sleeves by a bond of vulcanization to prevent slippage of the body of resilient rubber material relative to the sleeves. To obtain a good bond of vulcanization the sleeves and intervening body of resilient rubber material are heated to a high temperature at which the bond is made. The bushing is then cooled to a much lower temperature of operation and the intervening body of resilient rubber material undergoes considerable contraction because of the relatively high coefficient of expansion of rubber. In the past the shrinkage of the body of resilient rubber material has caused voids to be formed in the rubber and defects in the bonding to the sleeves because of the decrease in strength of the rubber while hot and the tension developed in the rubber during the shrinking operation.

The importance of the problem of compensating for the large contraction of the body of resilient rubber material upon cooling of the resilient bushing to eliminate the defects which have resulted during shrinkage has been recognized and manufacturers have resorted to such expedients as swaging or rolling the outer sleeve to a smaller diameter or expanding the inner sleeve to a larger diameter to decrease the volume of the space between the sleeves in which the body of resilient rubber material is disposed. These methods of compensating for the shrinkage of the body of resilient rubber material have required special equipment and handling of the bushings and the sleeves have had to be of materials which were soft and thin so that they could be deformed.

Objects of this invention are to provide a resilient bushing and a method of making a resilient bushing in which compensation for the large shrinkage of the body of resilient rubber material is made during the cooling of the bushing and without deforming the sleeves or requiring other changes to the resilient bushing; to provide resilient bushings with circumferentially continuous sleeves, to provide a method of making a bushing which is ready for use upon removal from the mold and to provide for ease of construction and simplicity of manufacture.

These and other objects will appear from the following description and from the accompanying drawings in which:

Fig. 1 is a cross-section of a mold containing the resilient bushing constructed in accordance with and embodying the invention during vulcanization of the body of resilient rubber material of the bushing, parts being broken away;

Fig. 2 is a view in perspective of the resilient bushing of the invention after vulcanization of the resilient body of rubber of the bushing and cooling of the parts;

Fig. 3 is a plan view of the resilient bushing shown in Figs. 1 and 2 after cooling and installation in a spring suspension, parts being sectioned and broken away;

Fig. 4 is a section taken along line 4—4 of Fig. 3, parts being broken away.

Referring to the drawings an injection mold 10 is shown in Fig. 1 for molding and vulcanizing a resilient bushing 11 into an integral structure. The resilient bushing 11 shown in the completed condition in Fig. 2 has an outer sleeve 12 of a material having a substantially high coefficient of expansion and is preferably of a metal such as aluminum. An inner sleeve 13 is disposed within the outer sleeve 12 at a position spaced-apart radially of the outer sleeve. The inner sleeve 13 is of a material having a substantially low coefficient of expansion and preferably is of a metal such as steel. The outer and inner sleeves, 12 and 13 respectively, are cylindrical in shape and are coaxial providing an intervening space between the sleeves for receiving a body of resilient rubber or other rubber-like material 14 which is adhered to the sleeves 12 and 13 by a vulcanized bond for cushioning relative turning movement of the sleeves in torsional shear.

The body of resilient rubber material 14 is adhered to the sleeves 12 and 13 by a bond of vulcanization under pressure and at a temperature of vulcanization which may be around 300 degrees Fahrenheit or over. As shown in Fig. 1 the vulcanization and bonding may be obtained in the three-piece injection mold 10 which has a lower portion 15, an intermediate portion 16 and an upper portion 17. The intermediate portion 16 has a cylindrical opening 18 for receiving the outer sleeve 12 in close fitting relationship in the heated condition and has a thickness substantially equal to the length of the sleeves 12 and 13.

The upper and lower portions 15 and 17 have opposing buttons 19 and 21 which are set in the mold portions in coaxial relationship with the aperture 18 of the middle portion 16. The buttons 19 and 21 fit within the inner sleeve 13 and hold it in position during the molding process.

The upper portion 17 of the mold 10 has a cavity 22 for receiving the resilient rubber material and this cavity is opened to the mold cavity and to the space between the sleeves 12 and 13 by a sprue 23 through which the resilient rubber material is injected into the space between the sleeves. An injection nozzle 24 having a size and shape corresponding to the cavity 22 may be used for introducing the rubbery material into the sprue 23 and into the bushing 11. A vent 25 is disposed in the mold 10 as is shown in the lower portion 15 for permitting the escape of gases during the molding process.

In making the resilient bushing 11 the mold 10 is opened to permit the positioning of the outer sleeve 12 of aluminum in the aperture 18 of the middle portion 16 and the inner sleeve 13 over the buttons 19 and 21 of the upper and lower portions 17 and 15 of the mold at a coaxial, radially spaced-apart position relative to the outer sleeve. The mold portions 15, 16 and 17 are heated to a temperature of around 300 degrees Fahrenheit or over by suitable means such as by steam and the mold portions 15, 16 and 17 are clamped together. The resilient rubber material is heated and introduced to the cavity 22 from which it is injected through the sprue 23 into the space between the sleeves 12 and 13 by the injection nozzle 24. With the space between the sleeves 12 and 13 filled under pressure with the body of resilient rubber material at the temperature of vulcanization, and the sleeves at this temperature, a bond is obtained between the rubber material and the sleeves providing an integral resilient bushing 11.

After a suitable curing time in the mold the vulcanization is completed, the resilient bushing 11 may be removed from the mold by separating the upper, intermediate and lower portions 15, 16 and 17 of the mold 10. The bushing may be cooled to normal operating temperatures such as room temperature of around 70 degrees Fahrenheit by exposing the bushing to the air at room temperatures or gradually reducing the surrounding temperature in an oven.

During the cooling period the body of resilient rubber material 14 tends to contract a relatively large amount. The outer sleeve 13 of aluminum likewise contracts a relatively large amount but the inner sleeve of steel undergoes a relatively small amount of contraction because of the different coefficients of expansion of the materials. Because the aluminum of the outer sleeve has a high coefficient of expansion and the steel of the inner sleeve has a relatively low coefficient of expansion, the volume of the space between the sleeves will be reduced a substantial amount while the body of rubber is shrinking during cooling. The body of resilient rubber material 14 will contract to a smaller volume corresponding to the volume and shape of the body in the unrestrained condition at the temperature to which it is cooled. Since the sleeves 12 and 13 are bonded to the rubber material the contraction of the body to the unrestrained condition is prevented and the material of the body will be held in tension. However the difference between the shape of the body of rubber material in the unrestrained condition and the shape of the body held in the space between the sleeves is small after cooling of the resilient bushing 11 because of the construction of the sleeves 12 and 13 and the resilient bushing is in satisfactory condition for use after removal from the mold 11 and cooling to normal operating temperatures.

Referring to Figs. 3 and 4 a typical installation of the resilient bushing 11 in a cushioning suspension is shown. This installation includes a supporting structure having a frame member 26 which has a cylindrical recess 27 for receiving half of the outer sleeve 12 of the resilient bushing 11 in embracing relationship. A bracket 28 having a cylindrical recess is mounted on the frame member 26 by bolts 29, 29 and nuts 30, 30 for clamping the other half of the outer sleeve 12 against the frame member 26 and holding the outer sleeve of the bushing against movement relative to the frame member.

A cylindrical shaft 31 is disposed to extend through the inner sleeve 13 of the resilient bushing in close fitting engagement with the inner sleeve and is held in non-rotative relationship with the inner sleeve by a pair of keys 32, 32 in the shaft 31 which engage the inner sleeve. The shaft 31 extends axially outward from the resilient bushing 11 at both ends. Arms 33, 33 for supporting a cushioned body are mounted on the ends of the shaft 31 and extend radially outward therefrom to the supported cushioned structure. The arms 33, 33 have apertures 34, 34 for receiving the ends of the shaft 31 and each arm is secured against rotation on the shaft by suitable means such as by set screws 35, 35 threaded through the arm and bearing against the keys 32, 32 which are long enough to extend through the apertures 34, 34 to engage the arms with the shaft.

In operation of the spring suspension of Figs. 3 and 4, relative turning movement of the arms 33, 33 and the frame member 26 tends to rotate the outer sleeve 12 relative to the inner sleeve 13 of the resilient bushing 11 and the intervening body of resilient rubber material 14 is stressed in torsional shear providing a soft cushioning of the movement. The relative movement of the arms 33, 33 and frame member 26 in other directions is cushioned by the body of resilient rubber material 14 in tension, compression and axial shear.

The steel inner sleeve 13 and the aluminum outer sleeve 12 may be circumferentially continuous and have the same shape and size in the finished spring suspension as they do before the resilient bushing 11 is made. In accordance with the invention it is possible to install the resilient bushing 11 in a spring suspension such as that shown in Figs. 3 and 4 without the necessity of further operations and special equipment to change the resilient bushing 11 to compensate for the large shrinkage of the body of resilient rubber material 14 upon cooling. Compensation for this shrinkage during the cooling operation is an inherent feature of the construction of the resilient bushing 11 and of the method of making the bushing as it is set forth in the description above.

Variations may be made without departing from the scope of the invention as it is set forth in the following claims.

I claim:

1. A resilient torsion bushing comprising an outer sleeve of material having a substantially high coefficient of expansion, an inner sleeve of material having a substantially low coefficient of expansion disposed within said outer sleeve at a radially spaced-apart position therewith, a body of resilient rubber material, having a temperature of vulcanization over 300 degree Fahrenheit, interposed between the sleeves and adhered thereto by a bond of vulcanization, said body of resilient rubber having a volume substantially the same as the volume of the space between said outer sleeve and said inner sleeve at the temperature of vulcanization, and the difference between the volume of said body of resilient rubber in an unrestrained condition and the volume of the space between the sleeves after cooling being small due to the relatively large contraction of said outer sleeve and the relatively small contraction of said inner sleeve.

2. A resilient torsion bushing comprising an outer sleeve of metal having a substantially high coefficient of expansion, an inner sleeve of metal having a substantially low coefficient of expansion disposed within said outer sleeve at a radially spaced-apart position therewith, a body of resilient rubber material having a temperature of vulcanization over 300 degrees Fahrenheit interposed between the sleeves and adhered thereto by a bond of vulcanization, said body of resilient rubber having a volume substantially the same as the volume of the space between said outer sleeve and said inner sleeve at the temperature of vulcanization, and the difference between the volume of said body of resilient rubber in an unrestrained condition and the volume of the space between the sleeves after cooling being appreciably small due to the relatively large contraction of said rubber sleeve and the relatively small contraction of said inner sleeve.

3. A resilient torsion bushing comprising an outer sleeve of aluminum, an inner sleeve of steel disposed within said outer sleeve at a radially spaced-apart position therewith, a body of resilient rubber material having a temperature of vulcanization over 300 degrees Fahrenheit interposed between the sleeves and adhered thereto by a bond of vulcanization, said body of resilient rubber having a volume substantially the same as the volume of the space between said outer sleeve and said inner sleeve at the temperature of vulcanization, and the difference between the volume of said body of resilient rubber in an unrestrained condition and the volume of the space between the sleeves after cooling being small due to the relatively large contraction of said outer sleeve and the relatively small contraction of said inner sleeve.

4. The method of making a resilient torsion bushing which comprises positioning an outer sleeve of material having a substantially high coefficient of expansion around an inner sleeve of material having a substantially low coefficient of expansion, expanding the sleeves by heating them to a temperature of vulcanization over 300 degrees Fahrenheit and introducing a body of rubber-like material into the space between said inner and outer sleeves in expanded condition to fill said space, curing and bonding said body of resilient rubber-like material to said sleeves at the temperature of vulcanization, and cooling said body of resilient rubber-like material and said sleeves which cooling results in a relatively large amount of contraction of said outer sleeve and a relatively small amount of contraction of said inner sleeve thus minimizing the difference between the volume of the contracted body of resilient rubber material in the unrestrained condition and the volume of the space between the sleeves at normal operating temperatures.

5. The method of making a resilient torsion bushing which comprises positioning an outer sleeve of aluminum around an inner sleeve of steel, expanding the sleeves by heating them to a temperature of vulcanization over 300 degrees Fahrenheit and introducing a body of rubber-like material into the space between said inner and outer sleeves in expanded condition to fill said space, curing and bonding said body of resilient rubber-like material to said sleeves at the temperature of vulcanization, and cooling said body of resilient rubber-like material and said sleeve to provide a relatively large amount of contraction of said outer sleeve and a relatively small amount of contraction of said inner sleeve thus minimizing the difference between the volume of the contracted body of resilient rubber material in the unrestrained condition and the volume of the space between the sleeves at normal operating temperatures.

6. The method of making a resilient torsion bushing which comprises positioning an outer sleeve of material having a substantially high coefficient of expansion around an inner sleeve of material having a substantially low coefficient of expansion in a mold, heating said mold and the sleeves to a temperature of vulcanization over 300 degrees Fahrenheit, filling the space between the sleeves with a body of resilient rubber-like material and bonding said body to the sleeves at the temperature of vulcanization, and removing said body of resilient rubber-like material and said sleeves from said mold for cooling the bushing assembly which cooling results in a relatively large amount of contraction of said outer sleeve and a relatively small amount of contraction of said inner sleeve thus minimizing the difference between the volume of the contracted body of resilient rubber material in the unrestrained condition and the volume of the space between the sleeves at normal operating temperatures.

7. The method of making a resilient torsion bushing which comprises positioning an outer sleeve of aluminum around an inner sleeve of steel in a mold, heating said mold and the sleeves to a temperature of vulcanization over 280 degrees Fahrenheit, filling the space between the sleeves with a body of resilient rubber-like material and bonding said body to the sleeves at the temperature of vulcanization, and removing said body of resilient rubber-like material and said sleeves from said mold for cooling the bushing assembly which cooling results in a relatively large amount of contraction of said outer sleeve and a relatively small amount of contraction of said inner sleeve thus minimizing the difference between the volume of the contracted body of resilient rubber material in the unrestrained condition and the volume of the space between the sleeves at normal operating temperatures.

References Cited in the file of this patent

UNITED STATES PATENTS

| Number | Name | Date |
|---|---|---|
| 1,758,712 | Morris | May 13, 1930 |
| 1,888,642 | Tryon | Nov. 22, 1932 |
| 2,063,325 | McLeod | Dec. 8, 1936 |
| 2,068,474 | Schwinn | Jan. 19, 1937 |
| 2,327,113 | Krotz | Aug. 17, 1943 |
| 2,351,329 | Gerstenmaier | June 13, 1944 |